US008485738B2

(12) United States Patent
Rosenberg et al.

(10) Patent No.: US 8,485,738 B2
(45) Date of Patent: Jul. 16, 2013

(54) OPTICAL FIBER CONNECTOR

(75) Inventors: Paul Kessler Rosenberg, Sunnyvale, CA (US); Sagi Varghese Mathai, Palo Alto, CA (US); Michael Renne Ty Tan, Menlo Park, CA (US); Moray McLaren, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 167 days.

(21) Appl. No.: 13/258,599

(22) PCT Filed: Jul. 31, 2009

(86) PCT No.: PCT/US2009/052409
§ 371 (c)(1),
(2), (4) Date: Sep. 22, 2011

(87) PCT Pub. No.: WO2011/014186
PCT Pub. Date: Feb. 3, 2011

(65) Prior Publication Data
US 2012/0027357 A1  Feb. 2, 2012

(51) Int. Cl.
G02B 6/36 (2006.01)
G02B 6/38 (2006.01)
G02B 6/43 (2006.01)

(52) U.S. Cl.
USPC .................................. 385/76; 385/71; 385/89

(58) Field of Classification Search
USPC ..................................................... 385/71, 76
See application file for complete search history.

(56) References Cited

U.S. PATENT DOCUMENTS

| 6,116,791 | A | 9/2000 | Laninga et al. |
| 6,402,389 | B1 | 6/2002 | Steijer et al. |
| 6,442,318 | B1 | 8/2002 | Goldman |
| 6,789,953 | B1 | 9/2004 | deJong et al. |
| 2002/0197046 | A1 | 12/2002 | Tourne |
| 2004/0114874 | A1 | 6/2004 | Bono et al. |
| 2007/0041083 | A1 | 2/2007 | Di Teodoro et al. |
| 2007/0292081 | A1 | 12/2007 | Hashimoto et al. |
| 2008/0240657 | A1 | 10/2008 | Dean et al. |

FOREIGN PATENT DOCUMENTS

| JP | 01234805 | 9/1989 |
| JP | 05157917 | 6/1993 |

OTHER PUBLICATIONS

International Searching Authority, International Search Report and The Written Opinion, 12 pages, Mar. 2010.

Primary Examiner — Omar Rojas
(74) Attorney, Agent, or Firm — Steven L. Webb

(57) ABSTRACT

An optical fiber connector is disclosed. The optical fiber connector comprises a form having a curved surface with a first end near the bottom surface of the form. The curved surface is perpendicular to the bottom surface of the form at the first end. A first plurality of active optical fibers are positioned along the curved surface of the form in a side-by side arrangement with the tips of each of the first plurality of optical fibers adjacent to the first end of the curved surface. The ends of each of the first plurality of active optical fibers have been striped down to cladding and the cladding of each optical fiber contacts the cladding of the adjacent optical fibers. An inner cover is attached to the form thereby capturing the first plurality of active optical fibers between the curved surface of the form and an inside curved surface in the inner cover.

15 Claims, 5 Drawing Sheets

OPTICAL FIBER CONNECTOR

BACKGROUND

Optical fibers are extensively used in telecom and datacom applications. Optical fiber connectors for these applications were developed to be used for voice and data transmission within markets that have demanding performance requirements and that can tolerate the purchase of expensive components. In addition, the traditional voice and data applications may not require the same degree of miniaturization that is needed for use inside crowded computer cabinets.

Prior solutions for connectorizing multiple optical fibers are typified by the MT-based family of ferrules and associated latching mechanisms such as the MPO and MTP connectors. The MT ferrule is a high precision part fabricated by transfer or injection molding. Each optical fiber assembled into the MT ferrule must be located into a dedicated molded hole. The position and diameter of the fiber locating holes are held to a tolerance of <3 um. After the fibers are loaded into the molded holes, they are fixed with adhesive. Afterwards, the face of the connector is precisely polished. Many of these assembly processes are primarily manual, and therefore expensive and challenging to ramp into very high volume production.

The standard MT ferrule is 8.1 mm long. The space required to accommodate a 90 degree turn of a standard multimode fiber ribbon is approximately 10 mm. Therefore a height of approximately 20 mm is required in order to achieve a 90 degree turn of the optical signal. Other connectors have been conceived that produce the optical turn in a smaller height dimension. These typically incorporate lenses, prisms, parabolic reflectors, or other relatively complicated optical elements. These components also typically incorporate relatively large parts and assemblies in order to perform the 'latching' function whereby two connectors are attached to each other, or connected to a transceiver.

DETAILED DESCRIPTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
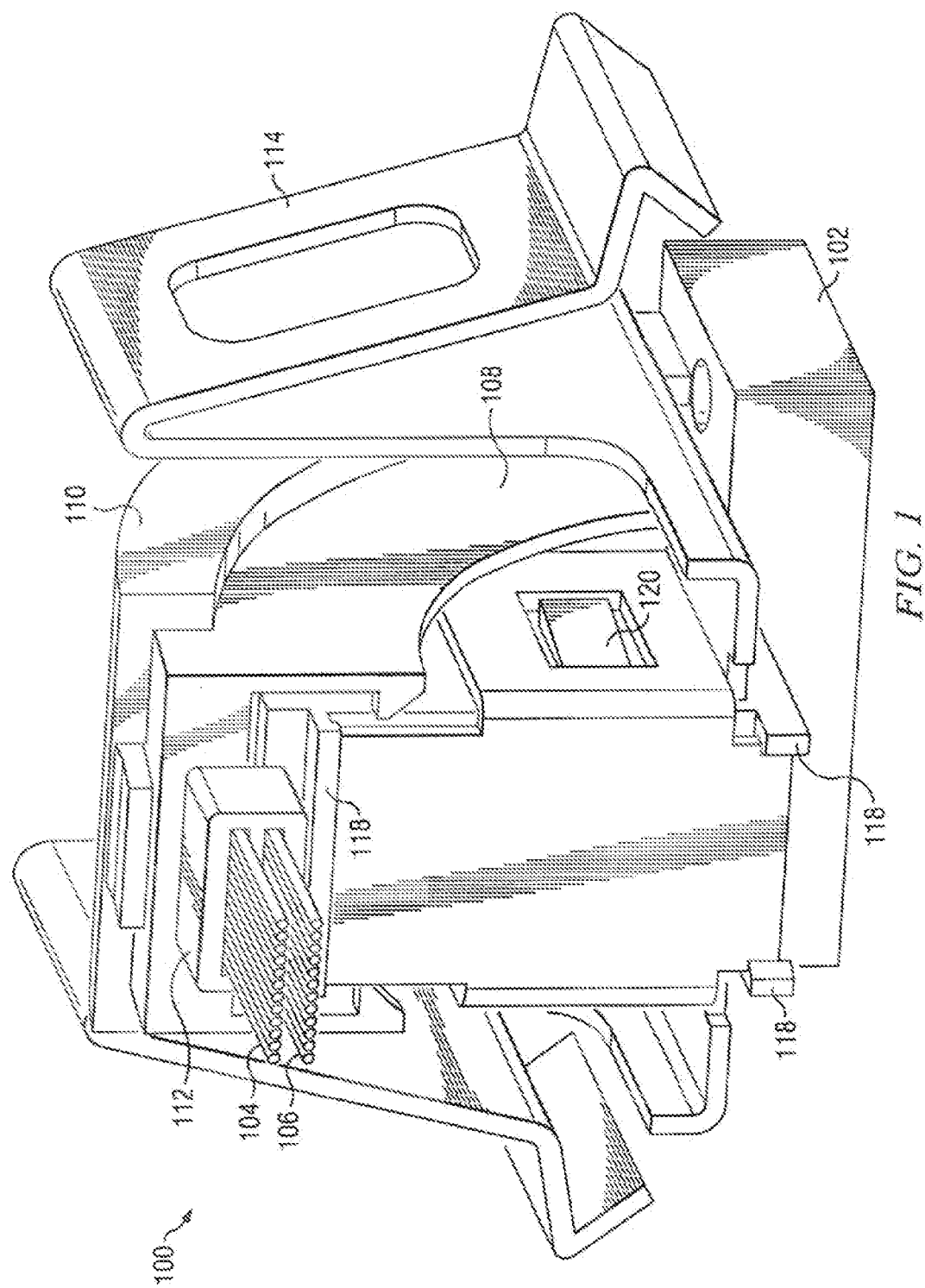
FIG. 1 is an isometric view of an optical fiber connector 100 in an example embodiment of the invention.
Figure 2:
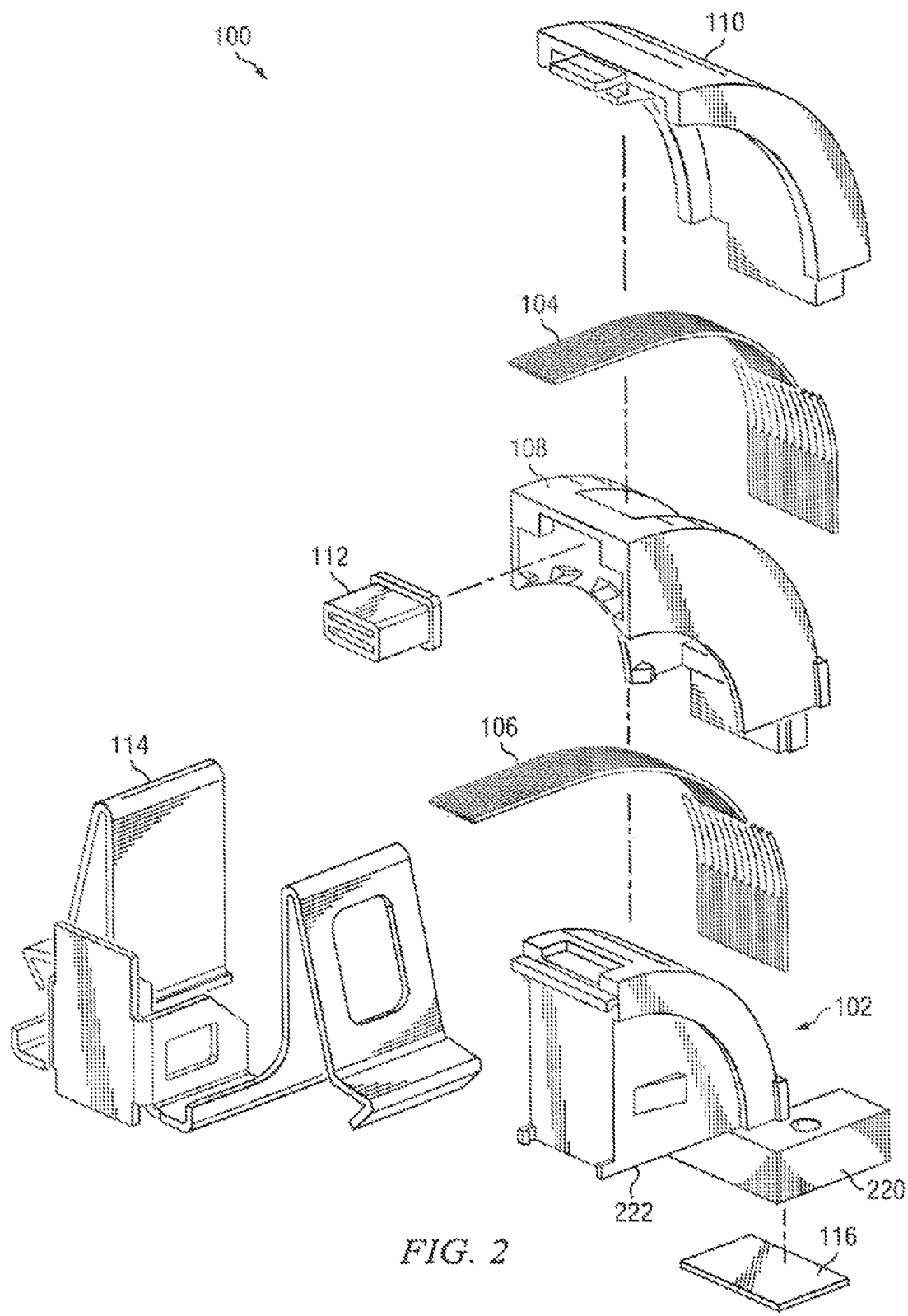
FIG. 2 is an exploded isometric view of optical fiber connector 100 in an example embodiment of the invention.

FIG. 1 is an isometric view of an optical fiber connector 100 in an example embodiment of the invention. FIG. 2 is an exploded isometric view of optical fiber connector 100 in an example embodiment of the invention. Optical fiber connector 100 comprises form 102, inner optical fibers 106, outer optical fibers 104, inner cover 108, top cover 110, stress relief boot 112, clip 114, and glass plate 116. In one example embodiment of the invention, form 102, inner cover 108 and top cover 110, may be molded out of any suitable material, for example plastic. Clip 114 may be fabricated as bent sheet metal, bent spring steel, or the like.

When assembled, glass plate 116 attaches to the bottom side of form 102. Inner optical fibers are positioned on the curved surface of form 106 with the ends of the optical fibers near to, and perpendicular with, the surface of the glass plate 116. Inner cover 108 attaches to form 102 thereby holding inner optical fibers 106 in place. Outer optical fibers 104 are positioned on the outer curved surface of inner cover 108 with the ends of the optical fibers near to, and perpendicular with, the surface of the glass plate 116. Top cover 110 attaches to inner cover 108 and holds outer optical fibers 104 in place. Stress relief boot 112 is captured between form 102 and inner cover 108 and holds both the inner and outer optical fibers (106 and 104) as they exit the optical fiber connector 100. Clip 114 is attached to form 102 and is used to hold optical fiber connector 100 against a mating part (see FIG. 7).

Form 102 incorporates most of the precision features used to locate each fiber in the optical fiber connector 100. Form 102 comprises two main parts, an upper part 222 and a lower part 220. The upper part 222 is generally in the shape of a rectangular box with one edge replaced with a curved surface. The curved surface runs from the bottom right edge of the rectangular box to the upper left edge (see FIG. 2). The curved surface of the upper part 222 of form 102 guides the inner optical fibers through a 90 degree bend. In one example embodiment of the invention, the curved surface forms a radius of 5 mm.

The lower part 220 of form 102 is also in the general shape of a rectangular box. The bottom surface at the lower right end of the upper part 222 of form 102 is attached to the top side of the lower part 220 of form 102. The long axis of the lower part 220 is parallel with the centerline of the curved surface formed in the top side of the upper part 222. Locating holes in the lower part 220 of form 102 are used to align the assembled connector to external components (see FIG. 3).

Figure 3:
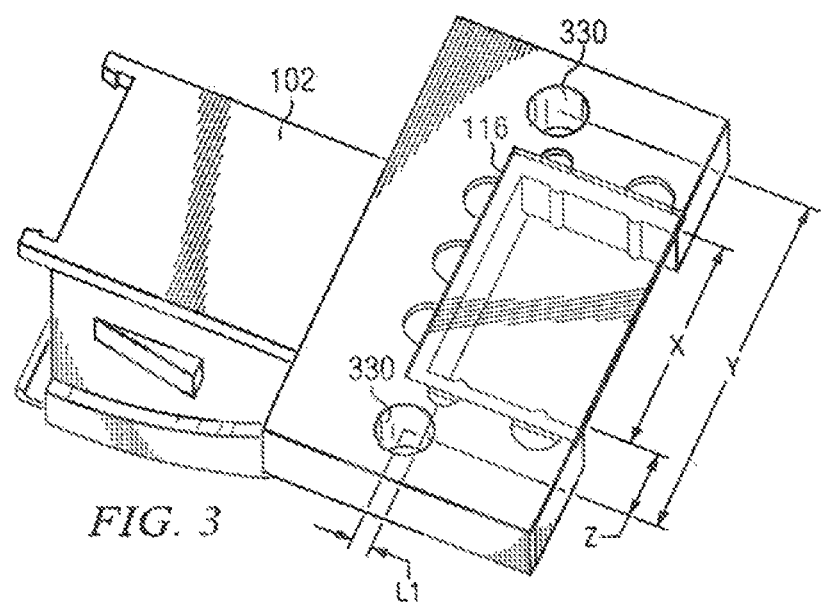
FIG. 3 is an isometric bottom view of form 102 in an example embodiment of the invention.

FIG. 3 is an isometric bottom view of form 102 in an example embodiment of the invention. Glass plate 116 is attached to an opening in the bottom surface of the lower part of form 102. Glass plate 116 may be held in place using a number of different attachment techniques including: adhesives, snaps, thermal bonding, or the like. FIG. 3 shows some of the dimensions that are controlled in form 102 to align the optical fibers in the optical connector to mating parts. Distance X is the optical fiber edge-to-edge length. Distance Y is the center-to-center distance between the two locating holes 330 formed in the lower part 220 of form 102. Distance Z is the distance between one of the locating holes 330 and one of the optical fiber edges. Distance L1 is the distance between the centerline of the two holes 330 and the front of the curved surface where the optical fibers are held. Distance L1 may be zero in some example embodiments of the invention.

Figure 4A:
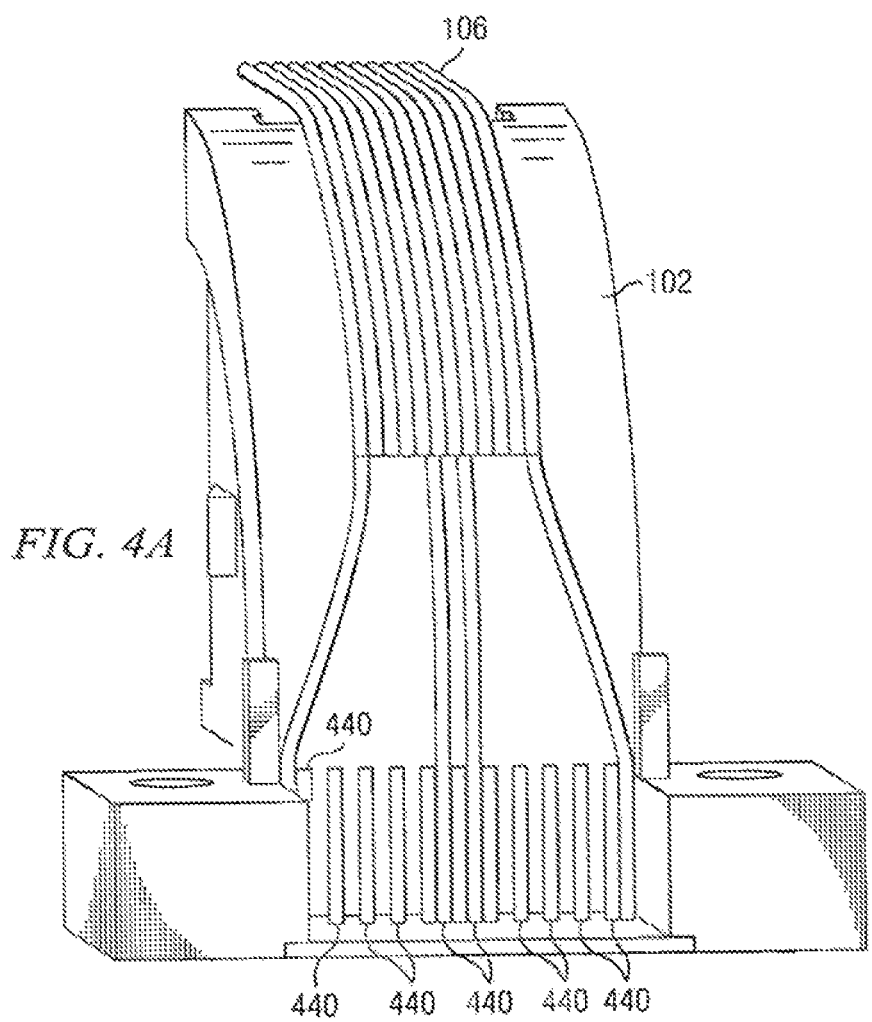
FIG. 4A is an isometric front view of form 102 in an example embodiment of the invention.

FIG. 4A is an isometric front view of form 102 in an example embodiment of the invention. FIG. 4A shows inner optical fibers 106 positioned along the top of the curved surface of form 102. All jackets, covers, etc. need to be removed from the ends of optical fibers positioned near the glass plate 116 so that the outer diameter (OD) of the fibers is determined by the thickness of the optical cladding. in one example embodiment of the invention inner optical fiber 102 comprises 12 'active' multimode optical fibers with a core diameter of between 50 um and 62.5 um. The outer diameter of the cladding in the example embodiment may be 125 um. The outer diameter of the cladding in glass optical fibers is typically closely controlled, usually to within +/−1 um. The tolerance of the outer diameter of the cladding in plastic optical fibers may be somewhat larger, typically +/−3 um.

Near the end of the inner optical fibers 106, each optical fiber may be separated from the other optical fibers to increase the spacing between the ends of the optical fiber. Spacers 440 may be placed between the ends of each of the inner optical fibers to control the spacing between each optical fiber. In one example embodiment of the invention, the spacers may comprise short segments of non-functioning optical fibers. The non-functioning optical fibers will also have all jackets, covers, etc. removed from the optical fibers so that the outer diameter (OD) of the fibers is determined by the closely controlled thickness of the optical cladding. When both the inner optical fibers and the spacing fibers have an OD of 125 um, the spacing between the active optical fibers will be 250 um. In an alternate embodiment, the spacers 440 may be features molded into the curved surface of form 102 or may be molded spacers having a closely controlled thickness.

The tips of the inner optical fibers are positioned close to the top surface of glass plate 116 with each optical fiber positioned perpendicular to the top glass surface. In one example embodiment, an optically transparent adhesive material is used to fill the gap between the tips of the optical fibers and the top surface of glass plate 116. The optically transparent adhesive martial may also be configured to fill gaps between the inner cover, the form, and the ends of the first plurality of active optical fibers. The optically transparent adhesive material optically couples the inner optical fibers 106 to the glass plate 116. The optically transparent adhesive material may be index-matched to the optical fibers, the glass plate, or both. By coupling the tips of the optical fibers to the glass plate 116, the tips of the fibers do not need to be polished. The optically transparent adhesive material will be injected between the inner optical fibers and the glass plate 116 after the inner cover has been attached to form 102. The bottom surface of glass plate 116 may have an anti-reflection coating to help eliminate back reflections from the glass-air interface.

In another embodiment of the invention, the glass plate may be replaced with a thin fiber face plate comprised of an array of optical fibers that have been drawn to a diameter in the range of 4-10 um. The fiber face plate acts to eliminate the divergence of an optical beam that passes through it. The face plate thereby reduces the potential for optical cross talk between adjacent optical channels and lessens the need to position the optical connector extremely closely to the active devices (lasers or photo detectors).

In another example embodiment of the invention, the adhesive material may contain a filler, such as dyes or opaque particles, in order to absorb light that escapes the cladding, thereby reducing optical cross talk between channels. Filling a small gap (10 um or less) between the tips of the optical fibers and the top of the glass plate with a pigmented adhesive will produce very little attenuation of the optical signal passing through it.

Figure 4B:
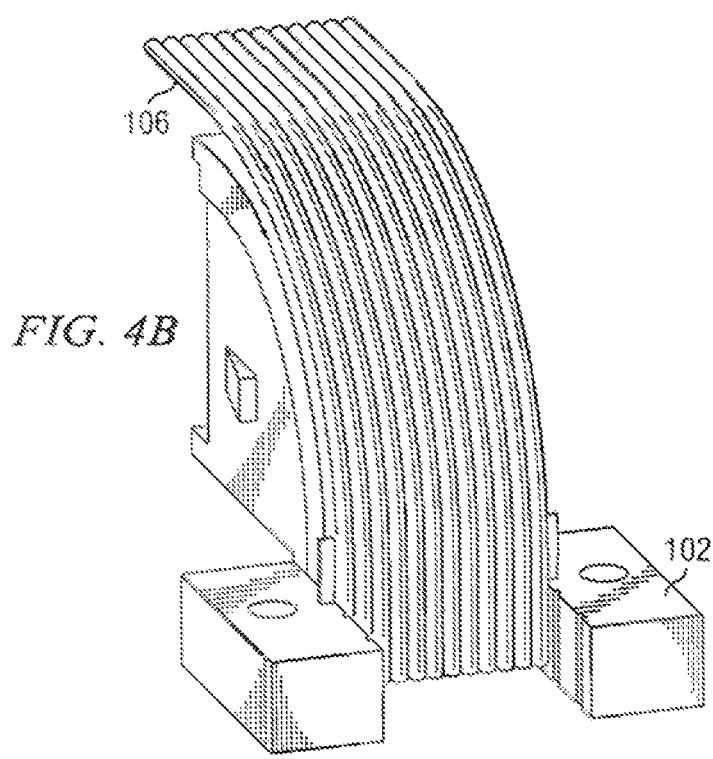
FIG. 4B is an isometric front view of form 102 in an alternate example embodiment of the invention.

In other example embodiments of the invention, the inner optical fibers may have a cladding OD of 250 um. In this example embodiment, there may not be spacers located between each active optical fiber. FIG. 4B is an isometric front view of form 102 in an alternate example embodiment of the invention. FIG. 4B shows inner optical fibers 106 positioned along the top of the curved surface of form 102. Each active optical fiber would be adjacent to other active optical fibers. After all the jackets, covers, etc. have been removed, the spacing between each active optical fiber is nominally 250 um.

In some example embodiments of the invention, the optical fibers may be fabricated from plastic, not glass. The plastic fibers may have a higher tolerance for surface finish defects on the tips of the fibers than an optical fiber fabricated from glass. This may allow the optical connector to be used without glass plate 116. FIG. 4B shows an example optical fiber connector without glass plate 116, in an example embodiment of the invention. The tips of inner optical fibers 106 may still be encapsulated in an optically transparent adhesive material. The optically transparent adhesive material will be trimmed off flush with the bottom face of form 102 using a cutoff wheel, laser, or the like.

Figure 5:
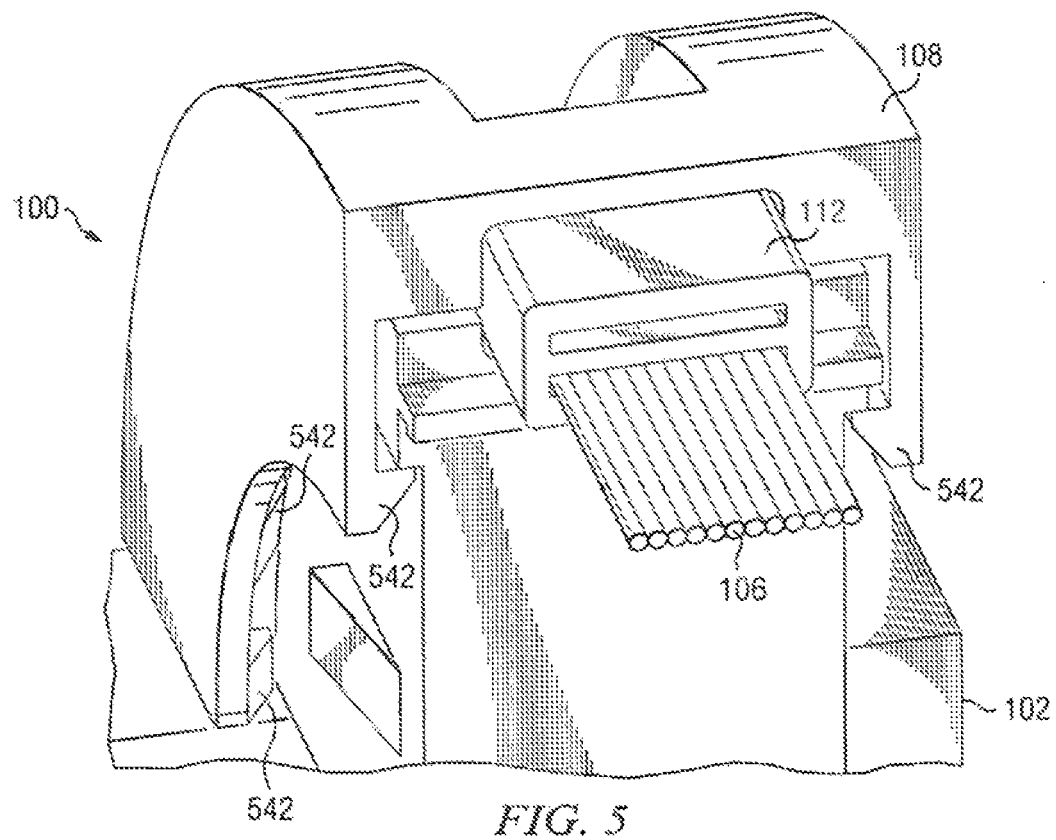
FIG. 5 is an isometric partial front view of optical fiber connector 100 partially assembled, in an example embodiment of the invention.

FIG. 5 is an isometric partial front view of optical fiber connector 100 partially assembled, in an example embodiment of the invention. FIG. 5 includes form 102, inner optical fibers 106, inner cover 108, and stress relief boot 112. Cantilevered clips 542 are formed as part of inner cover 108. Cantilevered clips 542 snap over mating features in form 102 and hold inner cover 108 against form 102. In other example embodiments of the invention, other methods of attachment may be used to hold inner cover 108 against form 102.

Figure 6:
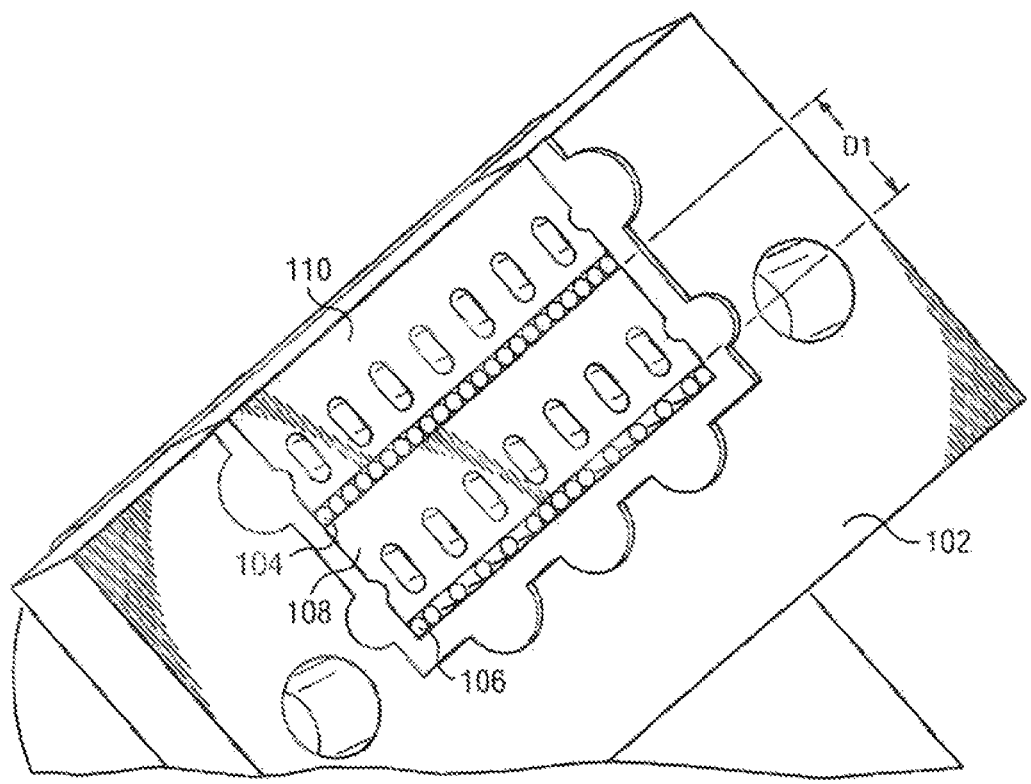
FIG. 6 is an isometric bottom view of optical fiber connector 100 partially assembled, in an example embodiment of the invention.

FIG. 6 is an isometric bottom view of optical fiber connector 100 partially assembled, in an example embodiment of the invention. FIG. 6 shows inner optical fibers 106, inner cover 108, outer optical fibers 104, and top cover 110 assembled into form 102. Inner optical fiber 106 is captured between form 102 and the inner surface of inner cover 108. Outer optical fiber 104 is captured between the outer surface of inner cover 106 and the inside surface of top cover 110. The distance D1 between the inner optical fibers 106 and the outer optical fibers 104 is controlled by the thickness of inner cover 108.

Clip 114 is attached to form 102 using features 118 and 120 (see FIG. 1) in one example embodiment of the invention. Features 118 snap onto the front face of clip 114. Features 120 snap into the sides of clip 114, thereby holding clip 114 against form 102. In other example embodiments of the invention, other attachment methods may be used to hold clip 114 against form 102. For example, screws, adhesives, thermal bonding, or the like may be used to attach clip 114 to form 102.

Figure 7:
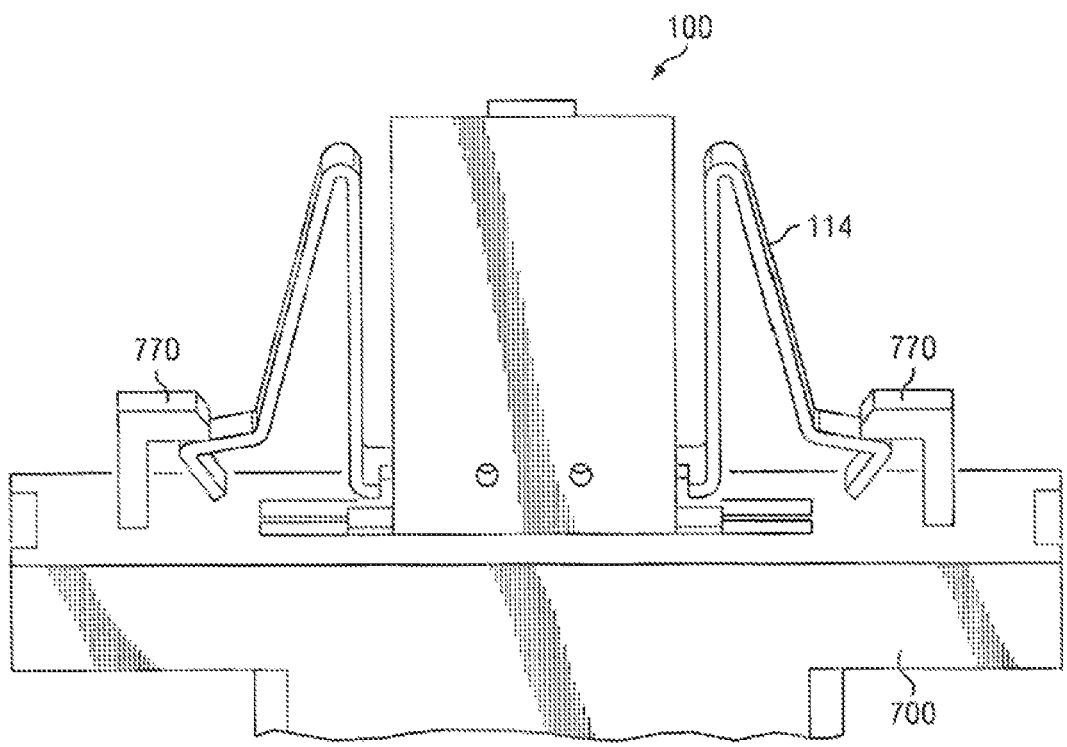
FIG. 7 is an isometric back view of optical fiber connector 100 attached to a mating part, in one example embodiment of the invention.

FIG. 7 is an isometric back view of optical fiber connector 100 attached to a mating part, in one example embodiment of the invention. In FIG. 7, optical fiber connector 100 is held in place against mating part 700 by clip 114 acting against cantilevered features 770. In other example embodiments of the invention, other attachment methods may be used to hold optical fiber connector in place. A mating optical part will reference to optical fiber connector 100 using holes 330 (see FIG. 3) so that the optical paths from inner and outer optical fibers would be aligned with the optical paths of the mating optical part.

The optical fiber connector 100 may be assembled using the following steps. Glass plate 116 may optionally be attached to the bottom of form 102. All jackets, covers, etc. are removed from the ends of the inner optical fibers 106. Stress relief boot 112 is slipped over the end of inner optical fibers 106. In some example embodiments of the invention, stress relief boot 112 is not needed and will not be installed. The ends of the inner optical fibers are positioned onto the curved surface of form 102. Depending on the OD of the optical fiber cladding and the spacing desired, spacers may be inserted between each of the inner optical fibers 106. In some example embodiments of the invention, the spacers may be short pieces of inactive optical fibers stripped of all jackets, covers, or the like. The inner cover 108 is attached to form 102 capturing the inner optical fibers 106 between the form 102 and the inner cover 108. The inner cover 108 causes the inner optical fiber 106 to bend through a 90 degree angle. The inner cover 108 also holds the tips of the inner optical fibers 106 adjacent to glass plate 116 or close to the bottom of form 102 when no glass plate is installed.

When using a glass plate 116, an adhesive material may be injected into the space between the optical fibers tips. The adhesive material may be injected through holes formed in inner cover 108, through holes in form 102, or both. The adhesive material fixes the optical fibers in place and fills in any small gaps between the ends of the optical fibers and the glass plate 116. Filling the gaps creates a mechanically strong and dimensionally stable structure that will maintain the positions of the individual fibers during exposure of the connector to temperature changes, shock and vibration. In one example embodiment, the adhesive material may be optically transparent and index-matched to the optical fibers, the glass plate, or both. In another example embodiment, the adhesive may contain a filler, such as dyes or opaque particles, in order to absorb light that escapes the cladding, thereby reducing optical cross talk between channels.

When the glass plate 116 is not to be used, an adhesive material is injected into the gaps between the fibers and between the fibers and the connector parts. The adhesive material may be injected through holes formed in inner cover 108, through holes in form 102, or from the bottom side of form 102. The adhesive material fixes the optical fibers in place. In one example embodiment, the adhesive material may be index-matched to the optical fibers. In another example embodiment, the adhesive may contain a filler, such as dyes or opaque particles, in order to absorb light that escapes the cladding, thereby reducing optical cross talk between channels. The adhesive material will be trimmed off flush with the bottom surface of form 102 using a cutoff wheel, laser, or the like. This process step is intended to produce a continuous, gap free surface that will not trap particles or other contaminants and can be cleaned with standard fiber connector cleaning materials.

In one example embodiment of the invention, optical fiber connector 100 may be assembled using only the inner optical fibers. When using only the inner optical fibers, clip 114 is now attached to form 102 and the assembly is complete.

When optical fiber connector 100 is to be used with both inner and outer optical fibers (106 and 104), assembly continues by removing all jackets, covers, etc. from the ends of outer optical fibers 104. When stress relief boot 112 is to be used, the ends of outer optical fibers 104 are inserted through stress relief boot 112. The ends of the outer optical fibers 104 are positioned onto the top curved surface of inner cover 108. Depending on the OD of the optical fiber cladding and the spacing desired, spacers may be inserted between each of the outer optical fibers 104. The top cover 110 is attached to inner cover 108 capturing the outer optical fibers 104 between the inner cover 108 and the top cover 110. The top cover 110 causes the outer optical fiber 104 to bend through a 90 degree angle. The top cover 110 also holds the tips of the outer optical fibers 104 adjacent to glass plate 116 or close to the bottom of form 102 when no glass plate is installed.

When using a glass plate 116, an adhesive material may be injected into the space between the optical fibers tips. The adhesive material may be injected through holes formed in top cover 110. The adhesive material fixes the optical fibers in place and fills in any small gaps between the ends of the optical fibers and the glass plate 116. Filling the gaps creates a mechanically strong and dimensionally stable structure that will maintain the positions of the individual fibers during exposure of the connector to temperature changes, shock and vibration. In one example embodiment, the adhesive material may be optically transparent and index-matched to the optical fibers, the glass plate, or both. In another example embodiment, the adhesive may contain a filler, such as dyes or opaque particles, in order to absorb light that escapes the cladding, thereby reducing optical cross talk between channels.

When the glass plate 116 is not to be used, an adhesive material is injected into the gaps between the fibers and between the fibers and the connector parts. The adhesive material may be injected through holes formed in top cover 110 or from the bottom side of form 102. The adhesive material fixes the optical fibers in place. In one example embodiment, the adhesive material may be index-matched to the optical fibers. In another example embodiment, the adhesive may contain a filler, such as dyes or opaque particles, in order to absorb light that escapes the cladding, thereby reducing optical cross talk between channels. The adhesive material will be trimmed off flush with the bottom surface of form 102 using a cutoff wheel, laser, or the like. This process step is intended to produce a continuous, gap free surface that will not trap particles or other contaminants and can be cleaned with standard fiber connector cleaning materials.

Clip 114 is now attached to form 102 and the assembly is complete.

What is claimed is:
1. A optical fiber connector, comprising:
   a form having a curved surface wherein a first end of the curved surface is parallel to a bottom surface of the form and a tangent to the curved surface at the first end is perpendicular to the bottom surface;
   a first plurality of active optical fibers positioned along the curved surface of the form in a side-by side arrangement with tips of each of the first plurality of optical fibers adjacent to the first end of the curved surface and where the ends of each of the first plurality of active optical fibers have been stripped down to cladding and where the cladding of each of the first plurality of active optical fibers contacts the cladding of the adjacent active optical fiber thereby spacing the tips of the first plurality of active optical fibers by a distance that equals an outer diameter of the cladding;
   an inner cover having an inside curved surface on a first side configured to mate with the curved surface of the form, where the inner cover is attached to form thereby capturing the first plurality of active optical fibers between the curved surface of the form and the inside curved surface of inner cover.

2. The optical fiber connector of claim 1, further comprising:
- an adhesive material positioned at the tips of the first plurality of active optical fibers and configured to fill gaps between the inner cover, the form, and the first plurality of active optical fibers.

3. The optical fiber connector of claim 1, further comprising:
- a plate attached to the bottom of form where a top surface of the plate is adjacent to the tips of the first plurality of active optical fibers and where the plate is selected from the following group: a glass plate, a fiber face plate.

4. The optical fiber connector of claim 1, further comprising:
- an outer curved surface on a second side of the inner cover, opposite the first side, whereby a first end of the outer curved surface is adjacent to, and parallel with, the bottom surface of the form, and a tangent to the outer curved surface at the first end is perpendicular to the bottom surface of the form;
- a second plurality of active optical fibers positioned along the outer curved surface in a side-by side arrangement with the tips of each of the second plurality of active optical fibers adjacent to the bottom surface of the form and where the ends of each of the second plurality of active optical fibers have been stripped down to cladding and where the cladding of each of the second plurality of active optical fibers contacts the cladding of the adjacent active optical fiber thereby spacing the tips of the second plurality of active optical fibers by a distance that equals an outer diameter of the cladding of the second plurality of active optical fibers, and where the spacing between the tips of the first plurality of active optical fibers and the tips of the second plurality of active optical fibers is determined by, a thickness of the inner cover between the first end of the outer curved surface and the first end of the inner curved surface, the outer diameter of the cladding of the first plurality of active optical fibers, and the outer diameter of the cladding of the second plurality of active optical fibers;
- a top cover having an inside curved surface configured to mate with the outer curved surface of the inner cover where the top cover is attached to the inner cover thereby capturing the second plurality of active optical fibers between the outer curved surface of the inner cover and the inside curved surface of top cover.

5. The optical fiber connector of claim 1, further comprising:
- a plurality of spacers wherein one of the plurality of spacers is inserted between each of the plurality of active optical fibers near the tips of the plurality of active optical fibers, where the spacing between each one of the tips of the plurality of active optical fibers is determined by the outer diameter (OD) of the cladding of the plurality of active optical fibers and an OD of the plurality of spacers, where the spacers are selected from the following group: inactive optical fibers striped down to cladding, molded spacer.

6. The optical fiber connector of claim 1, further comprising:
- a stress relief boot surrounding the plurality of active optical fibers and captured between the form and the inner cover at a second end of the curved surface of the form wherein the second end is opposite the first end.

7. The optical fiber connector of claim 1, wherein the curved surface of the form bends the first plurality of active optical fibers 90 degrees.

8. The optical fiber connector of claim 1, wherein the first plurality of active optical fibers form a ribbon cable of optical fibers.

9. The optical fiber connector of claim 1, further comprising:
- a clip attached to the form having a means for attaching the optical fiber connector to a mating part.

10. A method of fabricating an optical fiber connector, comprising:
- stripping a first end of each of a first plurality of active optical fibers down to cladding; positioning the first ends of the first plurality of active optical fibers onto a curved surface of a form in a side-by-side arrangement, whereby the tips of each of the first ends of the first plurality of active optical fibers are adjacent to, and perpendicular with, a top surface of a glass plate and where the cladding of each of the first plurality of active optical fibers contacts the cladding of the adjacent active optical fiber thereby spacing the tips of the first plurality of active optical fibers by a distance that equals an outer diameter of the cladding;
- attaching an inner cover to the form whereby the first plurality of active optical fibers are captured between the curved surface of the form and the inner cover;
- injecting an adhesive material into the gaps between each of the first ends of the first plurality of active optical fibers.

11. The method of fabricating an optical fiber connector of claim 10, further comprising:
- stripping a first end of each of a second plurality of active optical fibers down to cladding;
- positioning the first ends of the second plurality of optical fibers onto an outer curved surface on the inner cover, in a side-by-side arrangement, whereby the tips of each of the first ends of the second plurality of active optical fibers are adjacent to, and perpendicular with, the top surface of the glass plate and where the cladding of each of the second plurality of active optical fibers contacts the cladding of the adjacent active optical fiber thereby spacing the tips of the second plurality of active optical fibers by a distance that equals an outer diameter of the cladding of the second plurality of active optical fibers;
- attaching a top cover to the inner cover whereby the second plurality of active optical fibers are captured between the outer curved surface of the inner cover and the top cover;
- injecting an adhesive material into the gaps between each of the first ends of the second plurality of optical fibers.

12. A method of fabricating an optical fiber connector, comprising:
- stripping a first end of each of a first plurality of active optical fibers down to cladding; positioning the first ends of the first plurality of active optical fibers onto a curved surface of a form in a side-by-side arrangement, whereby the tips of each of the first ends of the first plurality of active optical fibers are adjacent to, and perpendicular with, a bottom surface of form and where the cladding of each of the first plurality of active optical fibers contacts the cladding of the adjacent active optical fiber thereby spacing the tips of the first plurality of active optical fibers by a distance that equals an outer diameter of the cladding;
- attaching an inner cover to the form whereby the first plurality of active optical fibers are captured between the curved surface of the form and the inner cover;
- injecting an adhesive material into the gaps between the tips of each of the first ends of the first plurality of active optical fibers;

trimming the optically transparent adhesive material flush with, and parallel to, the bottom surface of the form.

13. The method of fabricating an optical fiber connector of claim 12, further comprising:

stripping a first end of each of a second plurality of active optical fibers down to cladding;

positioning the first ends of the second plurality of optical fibers onto an outer curved surface on the inner cover, in a side-by-side arrangement, whereby the tips of each of the first ends of the second plurality of active optical fibers are adjacent to, and perpendicular with, the bottom surface of the form and where the cladding of each of the first plurality of active optical fibers contacts the cladding of the adjacent active optical fiber thereby spacing the tips of the first plurality of active optical fibers by a distance that equals an outer diameter of the cladding;

attaching a top cover to the inner cover whereby the second plurality of active optical fibers are captured between the outer curved surface of the inner cover and the top cover;

injecting an adhesive material into the gaps between the tips of each of the first ends of the second plurality of optical fibers;

trimming the optically transparent adhesive material flush with, and parallel to, the bottom surface of the form.

14. The method of fabricating an optical fiber connector of claim 10, further comprising:

inserting a plurality of inactive optical fiber spacers, stripped down to cladding, between each of the plurality of active optical fibers near the tips of the plurality of active optical fibers, where the spacing between each one of the plurality of active optical fibers is determined by the outer diameter (OD) of the cladding of the plurality of active optical fibers and an OD of the plurality of inactive optical fiber spacers.

15. The method of fabricating an optical fiber connector of claim 10, wherein the curved surface of the form bends the first plurality of active optical fibers 90 degrees.

* * * * *